(No Model.) 5 Sheets—Sheet 1.
C. ZIPERNOWSKY & M. DÉRI.
CURRENT CONVERTING APPARATUS.
No. 433,758. Patented Aug. 5, 1890.
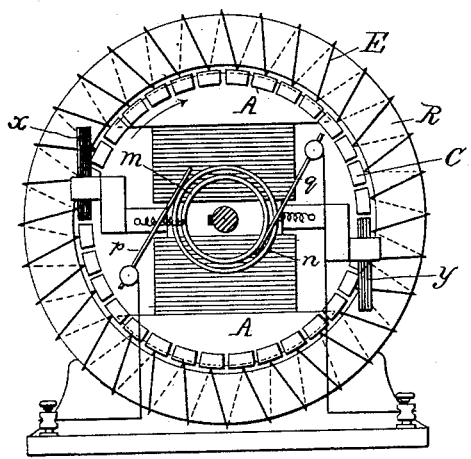
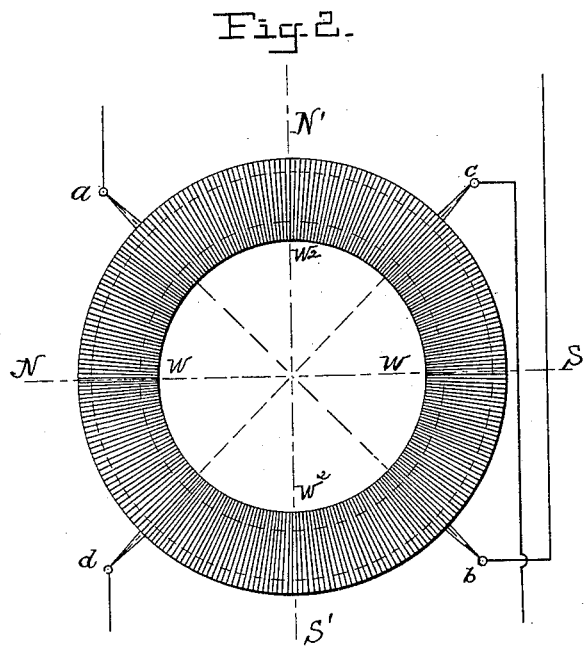
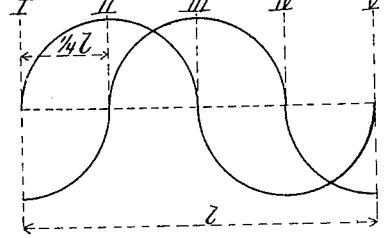
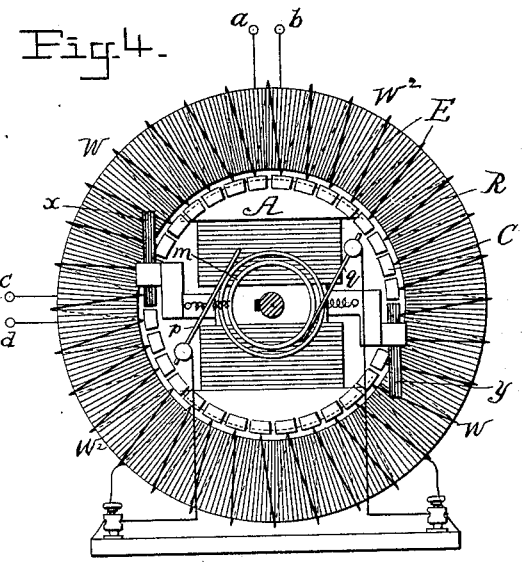
WITNESSES:
E. J. Griswold
Alex. Darkoff
INVENTORS
Carl Zipernowsky &
Maximilian Déri
BY Howson and Howson
their ATTORNEYS
THE NORRIS PETERS CO., PHOTO-LITHO., WASHINGTON, D. C.

(No Model.) 5 Sheets—Sheet 2.
C. ZIPERNOWSKY & M. DÉRI
CURRENT CONVERTING APPARATUS.
No. 433,758. Patented Aug. 5, 1890.
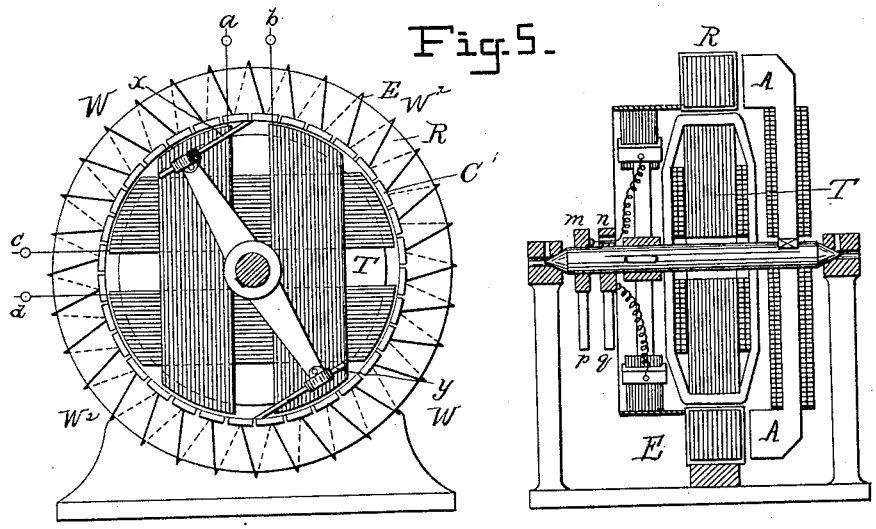
WITNESSES:
E. J. Griswold
Alex. Barkoff
INVENTORS
Carl Zipernowsky &
Maximilian Déri
BY
Howson and Howson
Their ATTORNEYS (No Model.) 5 Sheets—Sheet 3.
C. ZIPERNOWSKY & M. DÉRI.
CURRENT CONVERTING APPARATUS.
No. 433,758. Patented Aug. 5, 1890.
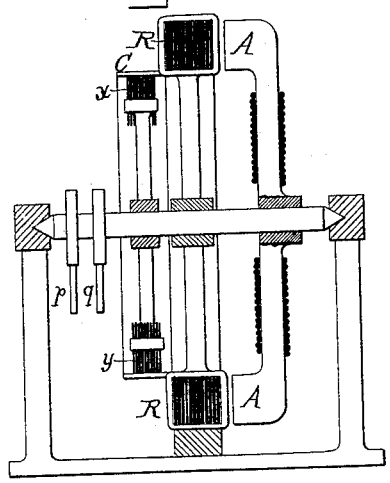
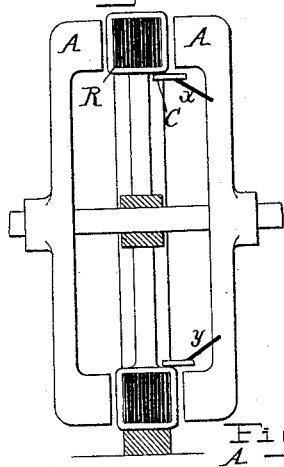
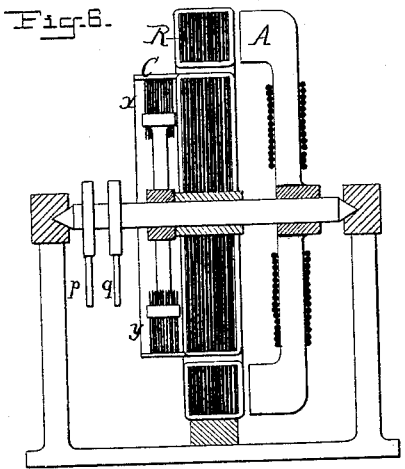
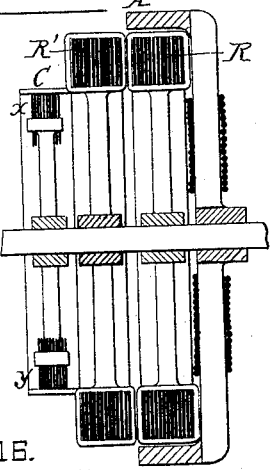
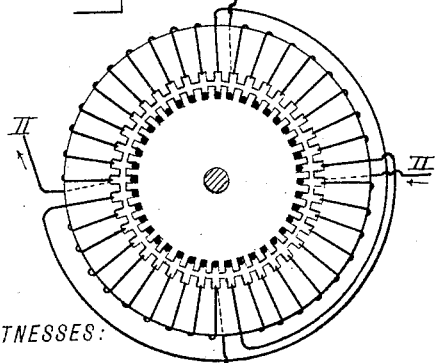
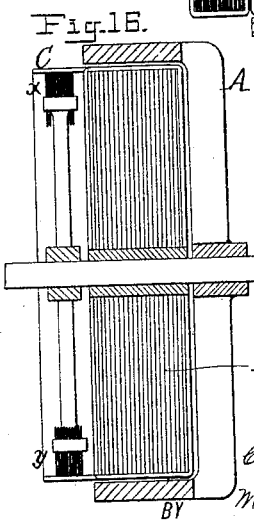
WITNESSES:
S. C. Connor
E. J. Griswold
INVENTOR
Carl Zipernowsky
and
Maximilian Déri
BY Howson and Howson
his ATTORNEYS.
THE NORRIS PETERS CO., PHOTO-LITHO., WASHINGTON, D. C.

(No Model.) 5 Sheets—Sheet 4.

C. ZIPERNOWSKY & M. DÉRI.
CURRENT CONVERTING APPARATUS.

No. 433,758. Patented Aug. 5, 1890.

WITNESSES:
E. J. Griswold
George Baumann

INVENTOR
Carl Zipernowsky
and Maximilian Déri
BY
Howson and Howson
Their ATTORNEYS (No Model.) 5 Sheets—Sheet

C. ZIPERNOWSKY & M. DÉRI.
CURRENT CONVERTING APPARATUS.

No. 433,758. Patented Aug. 5, 1890.

WITNESSES:
E. J. Griswold
George Baumann

INVENTOR
Carl Zipernowsky
and Maximilian Déri
BY
Howson and Howson
their ATTORNEYS

UNITED STATES PATENT OFFICE.

CARL ZIPERNOWSKY AND MAXIMILIAN DÉRI, OF BUDA-PESTH, AUSTRIA-HUNGARY.

CURRENT-CONVERTING APPARATUS.

SPECIFICATION forming part of Letters Patent No. 433,758, dated August 5, 1890.

Application filed November 1, 1888. Serial No. 289,725. (No model.)

*To all whom it may concern:*

Be it known that we, CARL ZIPERNOWSKY and MAXIMILIAN DÉRI, both subjects of the Emperor of Austria and King of Hungary, have invented an Improved Current-Converting Apparatus, of which the following is a specification.

Our improved apparatus has been designed mainly for the purpose of transforming alternating currents into continuous currents such as are produced by a continuous-current dynamo with a Gramme or Pacinotti collector or commutating device. It should be observed, however, that our apparatus can be used also for converting continuous currents into alternating currents.

Figure 7:
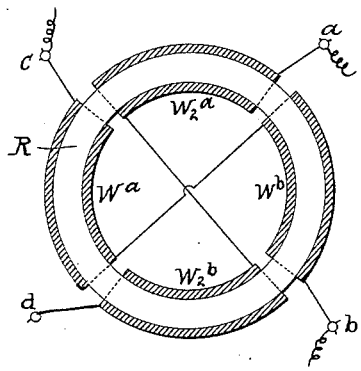
Figure 8:
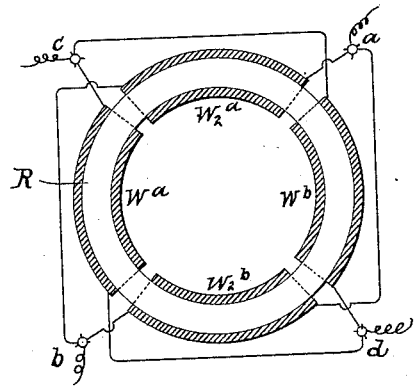
Figure 9:
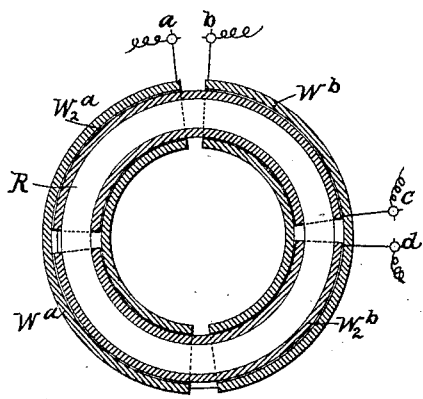
Figure 10:
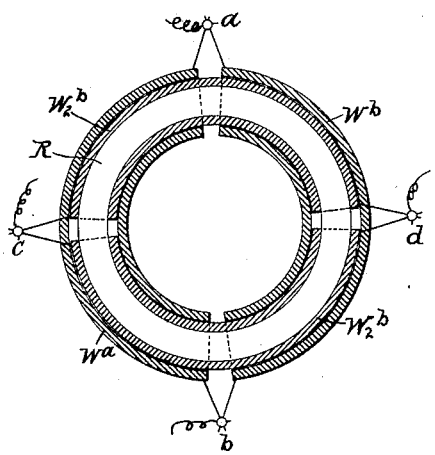
Figure 11:
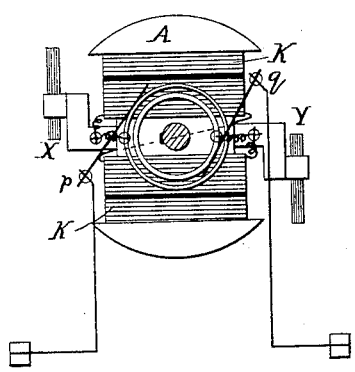
Figure 14:
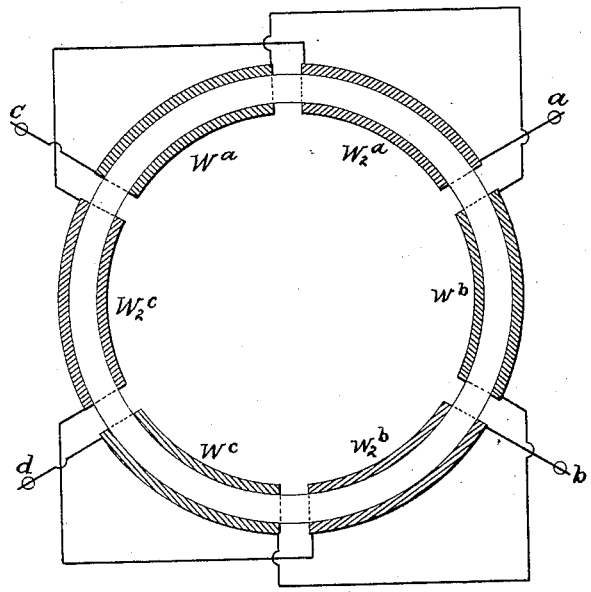
Figure 12:
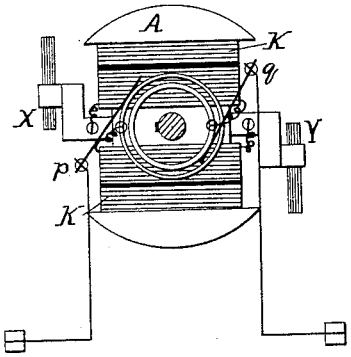
Figure 13:
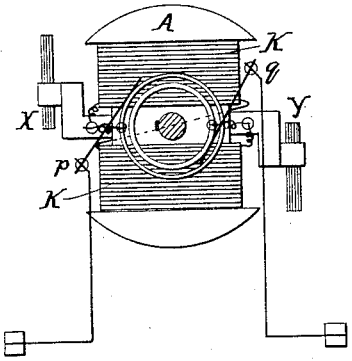
Figure 15:
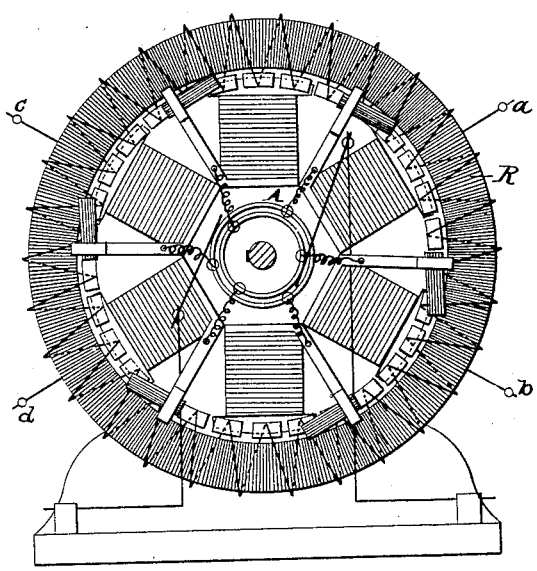

In the accompanying drawings, Figure 1 is a side elevation or diagram of a continuous-current dynamo of known construction. Fig. 2 is a diagram illustrating one of the elements of our apparatus. Fig. 3 is a diagram of the alternating-current waves. Fig. 4 is a view corresponding with Fig. 1, but illustrating our invention. Fig. 5 shows in elevation and vertical section a modification of our invention, and Fig. 6 is a sectional elevation of another modification. Fig. 6$^a$ is a diagram of the windings for the ring in Fig. 6. Figs. 7, 8, 9, and 10 are diagrams illustrating modes of connecting up the alternating-current coils. Figs. 11, 12, and 13 illustrate modes of connecting up the armature-coils. Fig. 14 is an illustrative diagram, and Fig. 15 is a side view of an apparatus in which there is employed an increased number of coils and poles. Figs. 16 to 19, inclusive, are views of other modifications.

In order to make clear the principle of our invention, we will first refer to Fig. 1, which represents simply a continuous-current dynamo. We have shown it as consisting of a fixed Gramme ring R, with a fixed commutator C, and internal rotating magnets A, which may either be permanent magnets or electro-magnets, excited in any suitable way. These rotating magnets carry commutator-brushes $x\,y$, which bear on the fixed commutator C, and are electrically connected with two contact-rings $m\,n$, keyed on the shaft of the rotating magnets. Upon these rings bear the two brushes $p\,q$. If now these brushes $p\,q$ are connected up in an electrical circuit and the magnets A are caused to rotate, it will be evident that a continuous current will be induced in that circuit. The magnetic field produced by the magnetism in the ring will be turned round three hundred and sixty degrees once in every revolution of the magnets A, the number of lines of force passing through any given turn or winding on the ring reaching a maximum and a minimum twice during the revolution. This continuous current will be produced if the rotation of the magnetic axis N S be effected in any other way.

We make use of the energy of alternating currents to cause this rotation of the magnetic axis, and through that means produce energy in the working-circuit in the form of a continuous current, or, in other words, convert alternating currents into continuous currents. In order to obtain this result, an iron ring, subdivided for the prevention of Foucault currents, is furnished with two pairs or sets of what we may term "field-coils" W and $W^2$, as shown in the diagram Fig. 2. If an alternating current be caused to circulate through each pair of coils, one of these two currents, lagging behind the other to the extent of a quarter of the wave-length, as shown in the diagram Fig. 3, there will be produced two magnetic fields N S and N' S' at right angles to one another. The intensity of these fields will depend on that of the exciting-currents. Supposing that the currents change their intensities according to the curve of sines, it will follow that the intensity of the resultant magnetism will remain constant, and the resultant magnetic axis will be turned around three hundred and sixty degrees for every complete current-wave $l$, Fig. 3. At the point of time represented by I in Fig. 3 the current in W is *nil*, while in $W^2$ it is at its maximum, and the resultant magnetic axis is therefore N S, Fig. 2. At the point of time II the current in W is at its maximum, while in $W^2$ it is *nil*, and the resultant magnetic axis has therefore turned around ninety degrees to the right, for example. At III the current in W is *nil* again, while in $W^2$ it is again at its maximum, but it has the opposite direction to that at I. At IV the current in W is at its maximum; but it has the opposite direction to that at II, while the current in W² is zero. At V the relations are again the same as they were at I. Thus during the period of a complete current-wave the axis of the resultant magnetic field has made a complete revolution, just as if it had been produced by the mechanical revolution of the magnets A in Fig. 1. If the ring R be furnished with a third coil continuously wound thereon, like a Gramme ring, and connected up to a commutator, induced currents will be obtained in this coil, which can be collected as a continuous current, as in the case of the ring-dynamo shown in Fig. 1. It should be noted that the brushes remain on the neutral points of the commutator, and therefore must rotate synchronously with the magnetic axis.

The alternating-current coils W and W² may be connected up in any suitable way. For instance, in Fig. 7 I have shown both halves of each system of coils connected in series, while in Fig. 8 they are shown connected in parallel. In both figures, however, each half of each system of coils occupies but one-quarter of the ring. In the arrangements shown in Figs. 9 and 10 each half of each coil system occupies one-half of the ring, and in Fig. 9 both halves are shown as connected in series, while in Fig. 10 they are shown connected in parallel.

Having thus explained the principle on which the invention is based, we will now describe the apparatus, which is shown in a simple form in Fig. 4. R is again the subdivided iron ring, on which are wound the two pairs of coils W and W², with terminals $a\ b$ $c\ d$. Through these terminals the alternating currents are supplied to the two pairs of coils, so that the current supplied to one coil lags behind the other a quarter of a wave-length. Besides these two pairs of coils there is wound upon the ring a third coil E, which is in the nature of a secondary coil, for the induced currents. Divisions of this secondary coil E are connected up to corresponding sections of the fixed commutator C, after the manner of a Gramme ring, for the production of the continuous current, and this coil E, for descriptive purposes, may therefore conveniently be termed the "continuous-current" coil.

Within the ring R is the iron armature A, keyed to the central shaft, so as to be free to rotate within the ring, and the armature also carries the pair of brushes $x\ y$, bearing upon the fixed commutator C and electrically connected to the two contact-rings $m\ n$ on the shaft. The iron armature will always seek to lie in the direction of the magnetic axis, and therefore will rotate synchronously with it. The brushes, being once for all placed on the neutral points and being rotated by the armature, will keep on the neutral points.

To make the apparatus start easily, the rotating iron armature is furnished with a coil closed upon itself, so that currents are induced in the coil in starting, increasing the torque between the armature and ring-magnet. As soon as synchronism is reached, these currents in the closed coil disappear. The coil or coils on the armature may be connected as a shunt to the induced continuous-current circuit, or the armature may have two coils—one closed upon itself and the other in series with the main continuous-current circuit obtained or a branch therefrom—in order to insure synchronous rotation. For instance, in the modification shown in Fig. 13 the coil or coils on the armature are connected as a shunt to the induced continuous-current circuit. In the diagram Fig. 12 the portion or portions K of the coils are short-circuited or closed upon itself or themselves, while the remainder of the coils are connected in series with the main continuous-current circuit. In the modification, Fig. 11, the portions K are closed upon themselves, while the other coils are connected to the main continuous-current circuit as a shunt.

In Fig. 5 we have shown an apparatus constructed on the principle described, but differing in some details. The coils for the alternating currents are in this case wound upon a fixed drum of subdivided iron, which is arranged within the ring R, carrying the coils E for the induced currents. In addition to these parts there is also a rotary armature A at one side of the coils and turning with the magnetic axis. The shaft of this armature carries the pair of brushes $x\ y$, which bear upon the commutator C', and which are electrically connected to the two contact-rings $m\ n$. Brushes $p\ q$ finally serve to lead the collected continuous current to the terminals of the machine, and thence to the local circuit.

The construction of the apparatus may be varied in a number of ways. Thus the rotating armature can be arranged outside or to one side or on both sides of the ring. In Fig. 16, for instance, is shown an arrangement in which the rotating armature A is arranged outside the ring, or, rather, in the particular device illustrated, outside the drum, for it should be understood that in this case the ring may be replaced by a drum wound like a common drum-armature, and with two coils for the alternating current and a third coil for the induced currents to be collected by the commutator and the rotating brushes carried by the armature or its shaft. In Fig. 17 is shown a construction in which the armature A is arranged at one side of the ring R, while in Fig. 18 is shown a construction in which the armature is in two parts on opposite sides of the ring.

The coils for the alternating currents and what has been termed the "induced secondary continuous-current coil" E can be wound onto two separate subdivided iron rings or drums, which may have one or more armatures. Such a construction is illustrated in Fig. 19, in which R represents one ring (or it may be a drum, such as in Fig. 16) furnished with the alternate-current coils, and R' is a second ring or drum wound with the continuous current-coil E and connected with the commutator device C. The armature A, which may be arranged inside of the ring R, as shown in Fig. 4, or outside of it, as here illustrated, turns as the magnetic axis turns and synchronously carries with it the commutator-brushes $x\ y$. Finally, the construction shown in Fig. 5 may be reversed to the extent that the inside drum shall be furnished, as illustrated in Figs. 6 and $6^a$, with coils for the induced currents and with a commutator C, while the outside ring R carries the coils for the alternating currents.

In all cases it will be useful to make the ring and drum with teeth and to wind the wires in the spaces between the teeth, in order to shorten the magnetic circuit as much as possible, as indicated, for instance, in the diagram Fig. $6^a$. Supposing that the alternating current to be converted makes eighty pole-reversals per second—that is, forty waves per second and two thousand four hundred per minute and a like number of revolutions per minute for the apparatus. In order to lessen this rather high speed, it is to the purpose, instead of two pairs of coils for alternating currents, to have four, six, eight, or more so arranged as to produce a ring or drum of many poles. To correspond with this, instead of two brushes, four, six, eight, or more must be used, or the commutator must be connected to the sections of the coil in a well-known manner so as only to require two brushes. The armature in Fig. 4 will also become one of many poles—that is, will have the form of a star—in order to shorten the magnetic circuit as much as possible. In Fig. 5 this is not necessary, as the magnetic circuit is completed in the ring and drum. For instance, in Figs. 14 and 15 we have shown an arrangement of six poles, in which case the armature would run at the rate of eight hundred revolutions to generate two thousand four hundred waves per minute. In Fig. 15 is shown the complete apparatus of six poles, with six brushes sliding on the commutator. The number of turns of the coils for the alternating and continuous circuits are calculated according to the ratio between the mean electro-motive force of the alternating current and that of the induced current. These electro-motive forces may be equal, or a high-tension or even a low-tension current may be converted directly without the aid of any other apparatus into a low-tension or a high-tension continuous current, respectively.

With the apparatus described, continuous currents may also be converted into alternating currents if the greatest part of the continuous current supplied be led through the contact-rings $m\ n$, and through the brushes in Figs. 4 and 5, for instance, into the commutator, and so into the coils for continuous currents. A small part of the current is employed, however, to effect the magnetization of the armature. By that means the apparatus will rotate in the same manner as a continuous-current motor, and there will be produced in the coils for the alternating currents two alternating currents, the phases of which are relatively shifted by one-quarter of the wave-length, and which are led off from the terminals to be used as desired.

In all cases the apparatus described convert alternating into continuous currents, or vice versa, but never convert alternating into alternating currents or continuous into continuous currents. The currents are therefore in all cases altered in their character, and, if necessary, also in their tension.

We claim as our invention—

1. An apparatus for converting alternating electrical currents into continuous currents, or vice versa, said apparatus consisting of a combination of a subdivided core having two or more coils conveying alternating currents with relatively shifted phases with another coil or coils, a commutator for the latter, and an iron armature carrying two or more brushes working on the commutator to convert the alternating currents into a continuous current, or vice versa, substantially as described.

2. An apparatus for converting alternating electrical currents into continuous currents, or vice versa, the said apparatus consisting of the combination of a subdivided iron core wound with two or more coils conveying alternating currents with relatively shifted phases, with a subdivided iron core wound with other coils connected with a commutator, and an armature carrying commutator, brushes to convert the alternating currents into continuous currents, or vice versa, substantially as set forth.

3. An apparatus for converting alternating electrical currents into continuous currents, or vice versa, the said apparatus consisting of the combination of a subdivided iron ring wound with two or more coils conveying alternating currents with relatively shifted phases, with a subdivided iron drum wound with other coils connected with a commutator, and an armature carrying commutator-brushes to convert the alternating currents into continuous currents, or vice versa, substantially as set forth.

4. An apparatus for converting alternating electrical currents into continuous currents, or vice versa, said apparatus consisting in the combination of two or more coils conveying alternating currents with relatively shifted phases with another coil or coils, a commutator in connection with the latter coil or coils, and an armature wound with a coil closed upon itself and with a coil receiving a continuous current, and commutator-brushes carried by the armature to convert the alternating currents into a continuous current, or vice versa, substantially as described.

5. An apparatus for converting alternating electrical currents into continuous currents, or vice versa, said apparatus consisting of the combination of a subdivided iron ring or drum-core and a subdivided ring-core surrounding the other, one of the cores being wound with two or more coils for two or more alternating currents with shifted phases, while the other core is wound with another coil or coils and has a commutator connected thereto, and an armature carrying commutator-brushes to convert the alternating currents into continuous currents, or vice versa, substantially as described.

In testimony whereof we have signed our names to this specification in the presence of two subscribing witnesses.

CARL ZIPERNOWSKY.
MAXIMILIAN DÉRI.

Witnesses:
MAURICE BLACK,
ALICE EDITH PRATT.